United States Patent [19]

Lewin et al.

[11] Patent Number: 4,836,259

[45] Date of Patent: Jun. 6, 1989

[54] SNOW AND ICE TRACTION DEVICE FOR AUTOMOTIVE VEHICLES

[76] Inventors: Henry B. Lewin, 6322 Lee Hwy.; Peter Bratic, 2304 N. Roosevelt St., both of Arlington, Va. 22205

[21] Appl. No.: 250,831

[22] Filed: Sep. 29, 1988

Related U.S. Application Data

[63] Continuation-in-part of Ser. No. 147,875, Jan. 25, 1988.

[51] Int. Cl.⁴ .............................................. B60C 27/06
[52] U.S. Cl. ................................. 152/222; 152/233; 152/243
[58] Field of Search ............... 152/241, 243, 244, 232, 152/231, 213 R, 233, 217, 218, 221, 222, 223

[56] References Cited

U.S. PATENT DOCUMENTS

| | | | |
|---|---|---|---|
| 1,267,544 | 5/1918 | Haubner | 152/221 X |
| 1,282,336 | 10/1918 | Walworth . | |
| 1,301,988 | 4/1919 | Weber . | |
| 1,494,689 | 5/1924 | Kennedy | 152/244 |
| 1,934,318 | 11/1933 | Metcalf et al. . | |
| 2,085,204 | 6/1937 | Sullivan . | |
| 2,267,242 | 12/1941 | Lutey . | |
| 2,422,595 | 6/1947 | Stevens . | |
| 2,607,387 | 8/1952 | Martin . | |
| 2,638,954 | 5/1953 | Anderson . | |
| 2,782,494 | 2/1957 | Gordon . | |
| 2,963,064 | 12/1960 | Rucker . | |
| 3,026,922 | 3/1962 | Akutowicz . | |
| 3,103,242 | 9/1963 | Culp . | |
| 3,192,983 | 7/1965 | Dalton et al. . | |
| 3,845,802 | 11/1974 | Tsipilis | 152/233 |
| 3,893,501 | 7/1975 | Brummer et al. | 152/213 R |
| 4,036,272 | 7/1977 | Lee . | |
| 4,074,741 | 2/1978 | Moore et al. . | |
| 4,155,389 | 5/1979 | Dwinell . | |
| 4,155,390 | 5/1979 | Okamura . | |
| 4,176,704 | 12/1979 | Thorpe . | |
| 4,243,087 | 1/1981 | Marchionda | 152/218 |
| 4,261,404 | 4/1981 | Lew . | |
| 4,263,954 | 4/1981 | Dwinell . | |
| 4,280,544 | 7/1981 | White . | |
| 4,321,956 | 3/1982 | Martinelli . | |
| 4,334,568 | 6/1982 | Thorpe . | |
| 4,334,569 | 6/1982 | Jacob et al. . | |

Primary Examiner—Michael W. Ball
Assistant Examiner—Gregory J. Wilber
Attorney, Agent, or Firm—Foley & Lardner, Schwartz, Jeffery, Schwaab, Mack, Blumenthal & Evans

[57] ABSTRACT

A traction device for a vehicle wheel composed of pair of cable members each having at least one closed loop formed in each end thereof, such that one end of each cable member can be extended through an aperture in a vehicle wheel and then the cable member can be wrapped toroidally around the wheel and the other loop end of the cable member can be passed through the loop in the first end and extended radially inwardly towards the axis of the wheel. The radially inwardly extended loop end of the cable member is then joined to at least one other similar cable member by a linearly adjustable connector such as a turnbuckle or an elastically resilient member with hooks thereon.

27 Claims, 2 Drawing Sheets

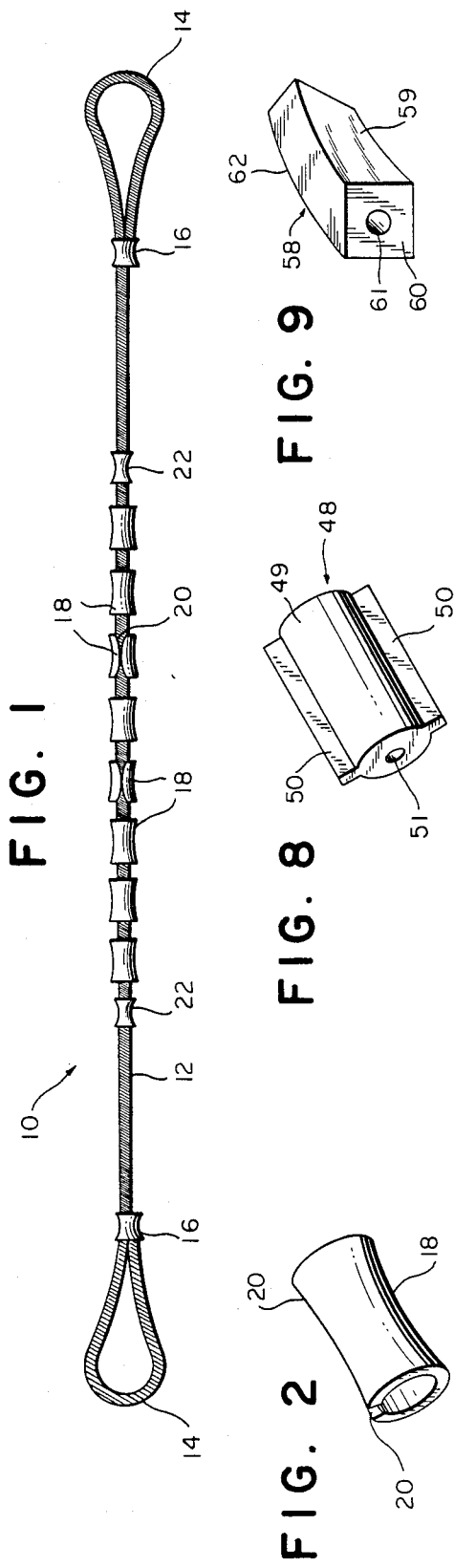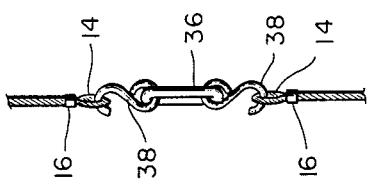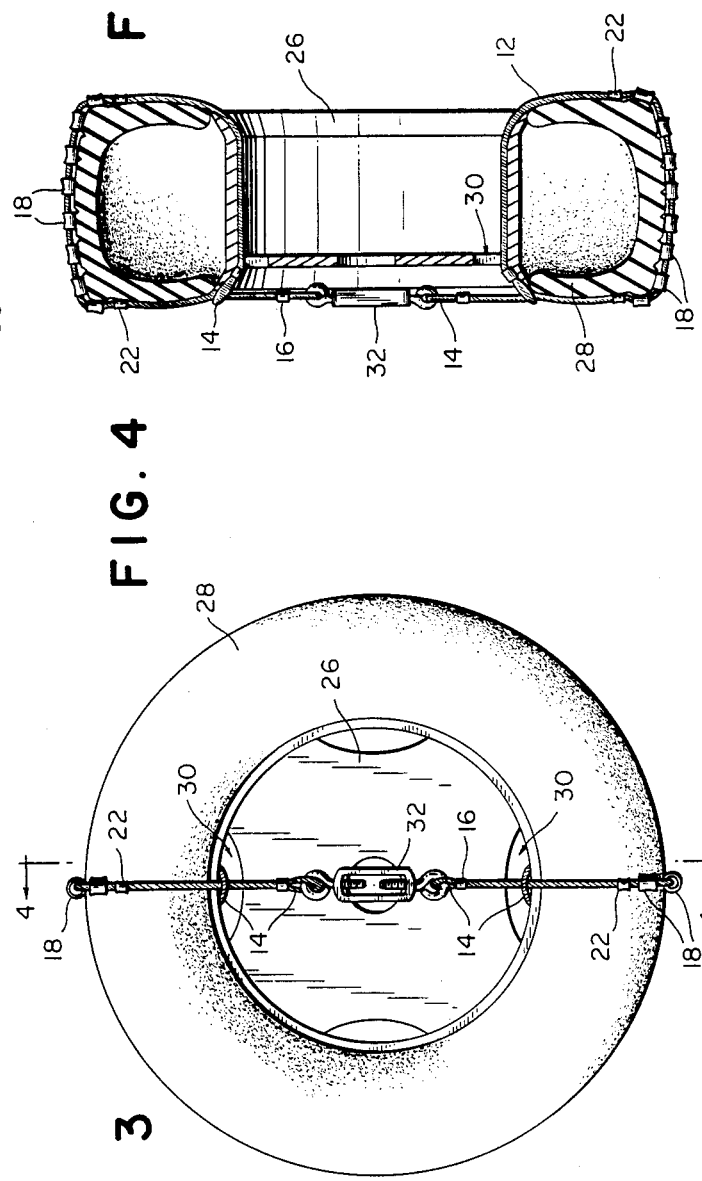

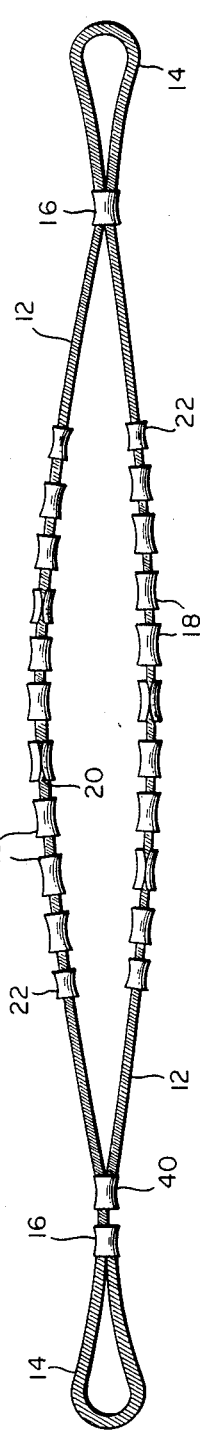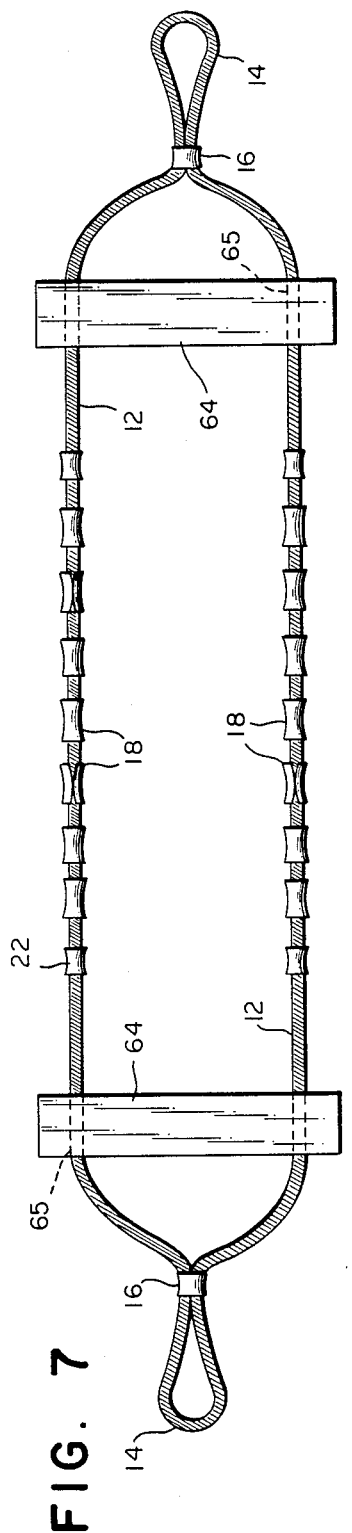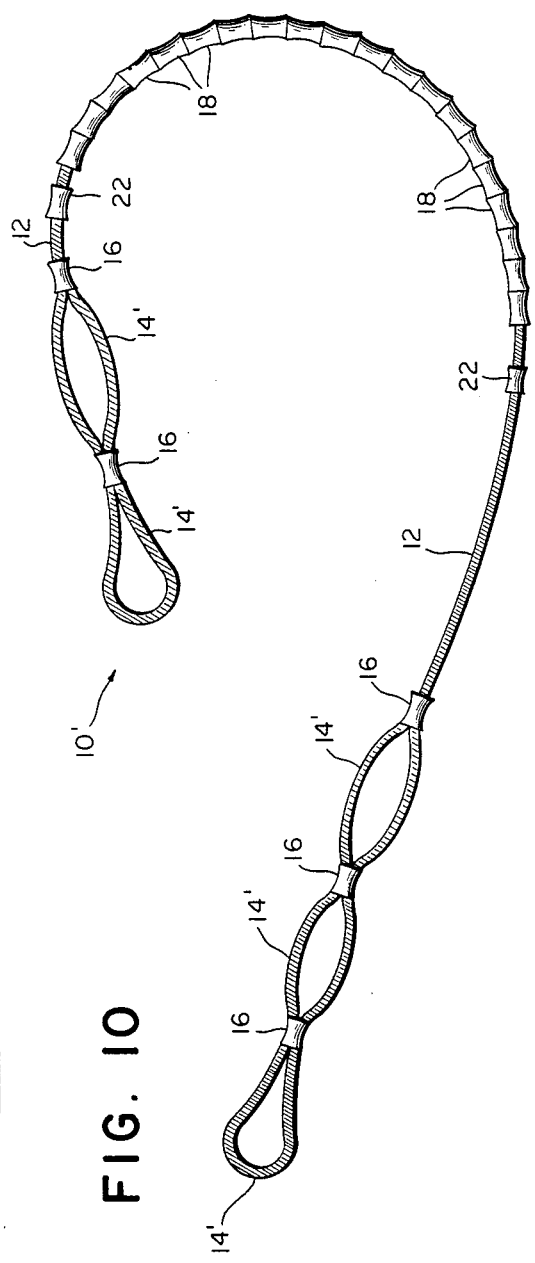

SNOW AND ICE TRACTION DEVICE FOR AUTOMOTIVE VEHICLES

This application is a continuation-in-part of co-pending application Ser. No. 147,875, filed Jan. 25, 1988.

BACKGROUND OF THE INVENTION

This invention relates to traction devices for automotive vehicles. In particular, this invention relates to traction devices which can be easily applied to a wheel assembly in case of inclement weather and easily removed for use on dry roads.

It is well known that ordinary automobile tires do not provide adequate traction on snowy and icy roads. Specially designed snow tires provide better traction in snow, but still may slip on icy roads, and they tend to be noisy when run on dry roads. So-called all season tires largely solve the noise problem, but still may lose traction on especially slick roads.

It is also known to embed studs in tires to improve tire traction on snowy and icy roads. However, because it is believed that such studs accelerate pavement deterioration when run on dry roads, their use is not permitted in many areas.

The best traction under snowy and icy conditions is achieved with the use of full tire chains. Such chains are heavy and awkward to apply or remove, and also tend to reduce the speed at which the vehicle can be operated. Moreover, different size chains are required for different size wheels, so that a merchant needs to keep a comparatively large inventory in stock to be able to meet the needs of all customers. Driving with full tire chains on dry roads may damage the chains or tires.

Numerous smaller and lighter weight traction attachments for automobile tires have been devised in attempts to overcome the disadvantages of conventional tire chains. Representative devices, for example, are disclosed in U.S. Pat. Nos. 1,282,336; 1,301,988; 1,934,318; 2,085,204; 2,267,242; 2,422,595; 2,607,387; 2,638,954; 2,782,494; 2,963,064; 3,026,922; 3,103,242; 3,192,983; 4,036,272; 4,074,741; 4,155,389; 4,155,390; 4,176,704; 4,261,404; 4,263,954; 4,280,544; 4,321,956; 4,334,568; and 4,334,569. In general such devices are themselves subject to the disadvantages that they either do not provide a sufficient improvement in traction, and/or they tend to come off the vehicle wheel, and/or they are not sufficiently durable, and/or they are themselves difficult to apply and remove. There remains a need for improved traction devices for automotive vehicle wheels.

SUMMARY OF THE INVENTION

It is the object of the invention to provide an improved traction device for an automotive vehicle wheel.

Another object of the invention is to provide a traction device which is easy to apply to and remove from a vehicle wheel.

A further object of the invention is to provide a traction device which provides a very substantial increase in the traction of an automotive vehicle wheel on snowy and/or icy roads.

It is also an object of the invention to provide a traction device which remains securely attached to the vehicle wheel during use and yet is easy to remove when desired.

An additional object of the invention is to provide a traction device for an automotive vehicle wheel which itself is durable and also exhibits little tendency to damage pavement even when run on dry roads.

A still further object of the invention is to provide a traction device which is easily adaptable to large or small wheels.

Another object of the invention is to provide a traction device which may be adjusted to wheels of different sizes or widths.

Yet another object of the invention is to provide a traction device which is comparatively inexpensive yet highly effective.

These and other objects of the invention are achieved by providing a traction device for an automotive vehicle wheel comprising a pair of cables with closed loops formed at each end; each said loop being of sufficient size that the loop at the opposite end and the cable may be passed therethrough; a plurality of cylindrical traction elements disposed around a central portion of each of said cables; means for retaining said traction elements in said central portion of each of said cables; and linearly adjustable means for connecting a loop of one cable to a loop of the other cable across the axis of a vehicle wheel on which said pair of cables are mounted.

BRIEF DESCRIPTION OF THE DRAWINGS

The invention will be described in further detail with reference to illustrative preferred embodiments shown in the accompanying drawings in which:

FIG. 1 shows a front view of one cable member of a first preferred embodiment of a traction device according to the present invention;

FIG;. 2 is a perspective view of a traction element for use with the traction device of FIG. 1.

FIG. 3 is a side view of a traction device according to the invention applied to an automotive vehicle wheel;

FIG. 4 is a sectional view taken along the line 4—4 of FIG. 3 showing the manner of application of the traction device of the invention;

FIG. 5 is a front view of an alternate linearly adjustable connector for use in the traction device of the invention;

FIG. 6 is a front view of an alternate preferred embodiment of the invention in which each cable is formed with dual strands;

FIG. 7 is a front view of another alternative preferred embodiment of the invention in which spaces are provided between the cables;

FIG. 8 is a perspective view of an alternate traction element embodiment for use in the presently claimed invention;

FIG. 9 is a perspective view of another preferred traction element embodiment for use in the present invention; and FIG. 10 is a perspective view of an additional embodiment of the present invention in which a plurality of loops are provided to accommodate wheels of different sizes or widths.

DETAILED DESCRIPTION OF PREFERRED EMBODIMENTS

FIG. 1 shows a front view of a cable member for use in a first embodiment of a traction device according to the present invention generally designated by reference numeral 10. As shown in the drawing, cable member 10 comprises a length of cable 12 which is bent back at each end to form a loop 14. In the illustrated embodiment, each end of the cable is extended through a crimpable fastener such as a cylindrical soft metal sleeve 16, then bent back, and the free end is inserted back into the sleeve. Sleeve 16 is then crimped to firmly fix the loop 14 in the end of cable 12.

The sleeves 16 may be formed of any suitably crimpable material. Good results have been achieved using approximately 1 inch lengths of aluminum tubing or soft copper tubing as the crimpable sleeves.

The size of the loop should be sufficient that the corresponding loop at the other end of the cable member can be easily passed therethrough. In general, a nominal diameter of from 1 to 3 inches is sufficient.

Cable 12 may be formed of any material exhibiting sufficient tensile strength and wear resistance to provide durable service and flexibility to permit easy applicaton. Good results have been achieved using conventional ⅛ to 5/16 inch diameter twisted steel wire cable for the cable members. Braided wire cable is also satisfactory. Other high tensile strength materials, such as aramid fiber cables, may also be used to good effect. A suitable material is sold by the DuPont company under the trade name "Kevlar".

A number of substantially cylindrical traction elements 18 are disposed around a central portion of the cable member. Traction members 18 are formed by rolling small plates or platelets of steel or other hard material into small cylinders.

An alternate traction element embodiment is illustrated in FIG. 8. Traction element 48 comprises a generally cylindrical molded synthetic polymer body 49 with radially outwardly extending ribs 50 formed thereon. Two ribs 50 are shown in the illustrated embodiment, but it will be appreciated that traction element 48 can be formed with any desired number of ribs. A central aperture 51 extends longitudinally through the cylindrical body 49 so that the traction element can be threaded on a cable member of a traction device according to the invention. Any non-brittle, high-strength synthetic polymer material may be used for the traction elements. Aramid polymers are particularly preferred. A suitable material is sold by the DuPont company under the trade name "Kevlar". If desired, the radial ribs may be configured to extend helically around cylindrical body 49.

Another alternate traction element embodiment for use in the present invention is illustrated in FIG. 9. Traction element 58 is formed as a twisted polygonal prism 59. The prism has polygonal end faces 60 which are displaced from each other in a rotary direction so that the longitudinal edges 62 of the traction element curve or rotate. The illustrated embodiment is shown with two square end faces 60 rotationally displaced by an angle of 45 degrees with respect to each other. It will be appreciated, however, that the end faces could have triangular, pentagonal, hexagonal or other polygon configurations, and that the degree of rotational displacement could be greater or less as desired. Traction element 58 is also provided with a longitudinal passageway 61 through which a cable member of the traction device of the invention may be extended. The inner diameter of the cylindrical traction elements is sufficiently larger than the outer diameter of the cable that the traction elements may rotate freely around the cable and also may slide freely in the axial direction. The rotation of the traction elements on the cable member allows even wear, lower noise and vibration, and less damage to the road surface.

It is also desirable to provide a traction device which is adjustable so that it is capable of being used on wheels of different widths. Such an adjustable device, which is shown in FIG. 10, has the advantage of broad usefulness and interchangeability among different wheel sizes.

In this embodiment, cable member 10' comprises a length of cable 12 and a plurality of cylindrical traction elements 18 disposed around a central portion of the cable member. However, instead of a single loop 14 as shown FIG. 1 and FIG. 7, a plurality of loops 14' are provided to impart adjustability as will be more fully described. Each loop is independent of other loops and can be formed by suitable means such as crimpable fastener 16 to firmly fix the loop 14'.

To retain traction elements 18 in the central portion of cable 12, retainers 22 are provided at each end of the series of traction elements 18. Retainers 22 may be formed as cylindrical bushings of malleable material which can be crimped in position on cable 12. For example, retainers 22 may be made of a short length of aluminum or copper tubing through which the cable is inserted and which is then crimped in position on the cable.

As seen more clearly in FIG. 2, the middle portion of each plate may be rolled more tightly than the side edges so that the corners 20 of the plate project or flare or project radially outwardly. These flared corners enhance traction on icy surfaces, and yet they do not prevent the traction elements from rotating freely around the cable member.

FIGS. 3 and 4 illustrate how the traction device of the invention is applied to a vehicle wheel 26 carrying a tire 28. As shown, the traction device of the invention comprises a set of two cable members 10. It will be appreciated, however, that sets of three, four, or even more cable members could be applied to a wheel without departing from the invention. To begin the application, one loop end 14 or 14' of each cable member 10 or 10' is inserted from the back of the wheel through an aperture 30 in the wheel adjacent the rim on which the tire is mounted. The cable member is then wrapped toroidally around the tire such that the traction elements 18 extend across the tread portion of the tire. The other loop end 14 or 14' of the cable is then extended through the first loop and on toward the axis of the wheel. The second cable member is applied to the opposite side of the tire in like manner.

The two radially inwardly extending loop ends 14 or 14' are then joined to each other by a linearly adjustable connector. In the illustrated embodiment, a turnbuckle 32 is used as the connector. The hooks of the turnbuckle are engaged with the radially inwardly extended loop ends 14 or 14' of the cable members, and then the turnbuckle is tightened to draw the loop ends toward each other and tighten up the cable members on the wheel and tire assembly.

In the adjustable traction device embodiment shown in FIG. 10 two or more loops 14' are advantageously provided at at least one end of cable member 10'. As many loops 14' can be provided as desired to achieve a range adjustability for wheels of different widths. In the embodiment illustrated, two loops 14' are provided at one end and three loops 14' are provided at the other end of cable member 10'. However, it is possible within the scope of the invention to provide a single loop on one end and two or more loops at the other end. Adjustability of the traction device is possible, whenever the cable member is provided with a plurality of closed loops at least at one end of the cable member.

In an illustrated embodiment, the two loops 14′ shown at the top of the drawing are both spaced a shorter distance from the traction elements 18 than the three loops 14′ at the other end of the cable shown at the bottom of the drawing. This arrangement makes possible five different size adjustment ranges merely by selecting an appropriate one of the five differently spaced loops.

To fasten the adjustable traction device, after toroidally wrapping the cable member around the tire to the tread portion of the tire as described above, one end loop 14′ is extended through a loop at the other end of the cable member which has been selected to accommodate the wheel width. Thereafter, the free inserted end is fastened to a corresponding free end of a second cable member in the manner previously described.

The cable members of the traction device are securely attached to the wheel and tire, and as the wheel and tire assembly is rotated, the traction elements on each cable member provide traction on slick surfaces. On dry road, however, the traction elements do not damage the road surface, so that the traction device of the invention need not be removed from the wheel and tire assembly when driving for short distances on dry pavement. It will be appreciated that the traction device of the invention is very light in weight and easy to attached to a wheel and tire assembly.

The length of a cable member may vary in the range from about 20 inches to about 40 inches. The use of linearly adjustable connectors allows one size of cable member to fit varying sizes of wheel and tire assemblies. As pointed out above, even greater adjustability can be achieved by providing a plurality of loops at at least one end of the cable member.

As the wheel and tire assembly is rotated, the dynamic forces acting on the cable members may cause them to more or "walk" slightly around the periphery of wheel. This is not detrimental, however, since it merely cinches the cable member more tightly around the wheel and tire.

FIG. 5 illustrates an alternative linearly adjustable connector for joining the radially extending loops of the two cable members to each other. Instead of turnbuckle 32, the connector comprises an elastically resilient member, such as an elastic rubber ring 36, to which are attached a number of hooks 38 corresponding to the number of cable members in the traction device. The lengths of the cable members and of the elastically resilient connector and chosen sufficiently short that the resilient connector must be stretched in order to engage the hooks 38 with the radially extending loops 14′ of the cable members. Subsequent contraction of the resilient connector draws the two end loops toward each other and pulls the cable members tight on the wheel and tire assembly. This arrangement has the advantage of facilitating rapid application of the traction device to a wheel assembly. It also has an increased ability to absorb shock forces acting on the cable members without breaking.

FIG. 6 shows an alternate cable member embodiment for a traction device according to the invention. The FIG. 6 cable member is substantially identical in form and function to the cable member illustrated in FIG. 1, except that it is provided with two wire strands 12 which extend across the tread portion of the tire. The ends of the cable may be joined within crimpable sleeve 16, or, if desired, a second crimpable sleeve 40 may be provided for this purpose.

FIG. 7 shows another alternate cable member embodiment generally corresponding to the traction device of FIG. 6, but additionally provided with spacers 64 which maintain a predetermined spacing between wire strands 12. Spacers 64 may be formed of any rigid material such as metal or synthetic polymer materials. In the illustrated embodiment, spacers 64 are provided with apertures 65 through which the cable members 12 extend. Alternatively, the spacers could be formed with notches or grooves having slightly constricted inlet openings through which the cable members 12 may be forced, and which then hold the cable members firmly.

FIG. 10, as previously described, illustrates an adjustable size traction device embodiment of the invention. All of the previously described alternate features may be used in the adjustable embodiment. As long as cable member 10′ is provided with a plurality of loops at least at one end of the cable member, the traction device is adjustable as to width across the tire tread. As shown in the example illustrated in FIG. 10, the loops 14′ are formed by bending the ends of cable 12 back at each end to a desired length so as to be capable of forming the desired number of loops at each end. The cable is extended through crimpable fasteners, which may be cylindrical soft metal sleeves 16, then bent back, and the free end is inserted back through the sleeves 16 which are then crimped to firmly fix the loops 14′ at each end of cable 10′.

The foregoing description has been set forth merely to illustrate the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. A traction device for an automotive vehicle wheel comprising a pair of cable members each having a closed loop formed of said respective cables at each end thereof; one of said loops on each cable being of sufficient size that the other loop on said cable and said cable can be passed therethrough and each of said cables being sized to pass through an aperture in said wheel toroidally around an automotive vehicle tire and through said one loop; a plurality of substantially cylindrical traction elements disposed around a central portion of each cable member; means for retaining said traction elements in said central portion of each cable member; and linearly adjustable means for connecting said other loop of one cable member to a corresponding other loop of the other cable member across the axis of an automotive vehicle tire upon which said traction device is mounted.

2. A traction device as recited in claim 1, wherein each cable member comprises two side by side cables each having a plurality of traction elements disposed around a central portion thereof, and means for retaining said traction elements in said central portions of said cables.

3. A traction device as recited in claim 1, wherein said retaining means comprise metallic bushings crimped on said cables.

4. A traction device as recited in claim 1, wherein said cable members comprise steel cables.

5. A traction device as recited in claim 4, wherein said steel cables comprise twisted multistrand steel cables.

6. A traction device as recited in claim 4, wherein said loops are formed by extending each end of the cable through a metallic sleeve, doubling the end of cable back to form a loop, extending the free end of the cable back through said sleeve, and crimping the metallic sleeve against the cable to fix the loop in the end of the cable.

7. A traction device as recited in claim 1, wherein said traction elements comprise steel platelets rolled so that opposite edges abut each other to form a substantially cylindrical element.

8. A traction device as recited in claim 7, wherein the inner diameter of each said cylindrical element is larger than the diameter of said cable so that said elements may slide longitudinally along and rotate circumferentially around said cable.

9. A traction device as recited in claim 7, wherein the corners of said rolled platelets flare radially outwardly to form traction teeth.

10. A traction device as recited in claim 1, wherein said cable members comprise aramid fiber cables.

11. A traction device as recited in claim 1, wherein said connecting means comprises a turnbuckle.

12. A traction device as recited in claim 1, wherein said connecting means comprises a pair of hooks joined to each other by an elastically resilient member.

13. A traction device as recited in claim 2, further comprising spacers for maintaining a desired separation between said two side by side cables of each cable member.

14. A traction device as recited in claim 1, wherein said traction elements comprise cylindrical bodies with radially projecting ribs thereon and a central aperture therethrough through which said cable members are extended.

15. A traction device as recited in claim 1, wherein said traction elements comprise twisted polygonal prisms with central apertures through which said cable members are extended.

16. A traction device for a wheel comprising a pair of cable members, each cable member having at least one closed loop formed of said respective cables at one end and a plurality of closed loops formed of said respective cables at the other end thereof; said loops on each cable being of sufficient size that one end loop of said cable and said cable can be passed through a loop on the other end of said cable, and each of said cables being sized to pass through an aperture in said wheel toroidally around an automotive vehicle tire and through a loop on said other end of the cable; a plurality of traction elements disposed around a central portion of each cable member; means for retaining said traction elements in said central portion of each cable member; and linearly adjustable means for connecting said one end loop of one cable member to a corresponding loop of the other cable member across the axis of the wheel upon which said traction device is mounted.

17. A traction device as recited in claim 16, wherein said retaining means comprise metallic bushings crimped on said cable members.

18. A traction device as recited in claim 16, wherein said cable members comprise steel cables.

19. A traction device as recited in claim 18, wherein said steel cables comprise twisted multistrand steel cables.

20. A traction device as recited in claim 16, wherein said loops are formed by extending each end of the cable through at least one metallic sleeve, doubling the end of cable back to form a loop, extending the free end of the cable back through said at least one sleeve, and crimping each metallic sleeve against the cable to fix the loop.

21. A traction device as recited in claim 16, wherein said traction elements comprise steel platelets rolled so that opposite edges abut each other to form a substantially cylindrical element.

22. A traction device as recited in claim 21, wherein the inner diameter of each said cylindrical element is larger than the diameter of said cable so that said elements may slide longitudinally along and rotate circumferentially around said cable.

23. A traction device as recited in claim 16, wherein said connecting means comprises a turnbuckle.

24. A traction device as recited in claim 16, wherein said connecting means comprises a pair of hooks joined to each other by an elastically resilient member.

25. A traction device according to claim 16 wherein each cable member has a plurality of closed loops at each end.

26. A traction member according to claim 25 wherein each cable member has two closed loops at one end and three closed loops at the other end.

27. A traction device for an automotive vehicle wheel comprising a pair of cable members each having at least one closed loop formed of said respective cables at each end thereof; each loop on each cable being of sufficient size that a loop on the other end of said cable and said cable can be passed therethrough, and each of said cable members being sized to pass one end through an aperture in said wheel toroidally around an automotive vehicle tire and through a loop on the opposite end; a plurality of substantially cylindrical traction elements disposed around a central portion of each cable member; means for retaining said traction elements in said central portion of each cable member; and linearly adjustable means for connecting a loop on said one end of one cable member to a corresponding loop of the other cable member across the axis of an automotive vehicle tire upon which said traction device is mounted.

* * * * *